United States Patent
Huffman et al.

(10) Patent No.: US 6,775,742 B2
(45) Date of Patent: Aug. 10, 2004

(54) MEMORY DEVICE STORING DATA AND DIRECTORY INFORMATION THEREON, AND METHOD FOR PROVIDING THE DIRECTORY INFORMATION AND THE DATA IN THE MEMORY DEVICE

(75) Inventors: William A. Huffman, Los Gatos, CA (US); Jeffrey S. Kuskin, Mountain View, CA (US)

(73) Assignee: Silicon Graphics, Inc., Mountain View, CA (US)

( * ) Notice: Subject to any disclaimer, the term of this patent is extended or adjusted under 35 U.S.C. 154(b) by 455 days.

(21) Appl. No.: 09/909,693

(22) Filed: Jul. 20, 2001

(65) Prior Publication Data

US 2002/0032838 A1 Mar. 14, 2002

Related U.S. Application Data

(60) Provisional application No. 60/219,947, filed on Jul. 20, 2000.

(51) Int. Cl.⁷ .............................................. G06F 12/00
(52) U.S. Cl. ........................................ 711/118; 711/173
(58) Field of Search ................................. 711/118, 173

(56) References Cited

U.S. PATENT DOCUMENTS

| | | | | |
|---|---|---|---|---|
| 5,835,928 A | * | 11/1998 | Auslander et al. | 711/3 |
| 5,905,996 A | | 5/1999 | Pawlowski | 711/119 |
| 6,049,476 A | | 4/2000 | Laudon et al. | 365/52 |
| 6,473,833 B1 | * | 10/2002 | Arimilli et al. | 711/122 |
| 6,560,681 B1 | * | 5/2003 | Wilson et al. | 711/144 |

OTHER PUBLICATIONS

International Search Report in International Application No. PCT/US 01/23109, dated Oct. 30, 2001, 6 pages.

* cited by examiner

*Primary Examiner*—Mano Padmanabhan
*Assistant Examiner*—Paul Baker
(74) *Attorney, Agent, or Firm*—Baker Botts L.L.P.

(57) ABSTRACT

A memory device and method which provide at least one memory segment. The memory segment includes at least one first portion which is configured to store data. The memory segment also includes at least one second portion associated with the first portion, and which is configured to store directory information for at least one cache line thereon.

28 Claims, 3 Drawing Sheets

MEMORY DEVICE STORING DATA AND DIRECTORY INFORMATION THEREON, AND METHOD FOR PROVIDING THE DIRECTORY INFORMATION AND THE DATA IN THE MEMORY DEVICE

This application claims the benefit of U.S. Provisional Application Serial No. 60/219,947 filed Jul. 20, 2000.

FIELD OF THE INVENTION

The present invention relates, in general, to a memory device and to a method for providing the memory device, and more particularly to the memory device which stores data and directory information for at least one cache line thereon, and to the method which allocates sections of the memory device to store the directory information and the data thereon.

BACKGROUND OF THE INVENTION

In conventional computer systems, data is written into (and read from) a number of memory arrangements via known interfaces. With the current advances in the microprocessor controlling/accessing technology, it is now possible to utilize data busses which provide a large amount of data to the components of the existing computer systems. Thus, the current memory arrangements (which are either provided in or communicating with the known computer systems) are now capable of receiving, storing thereon and providing large amounts of data.

With the recent introduction of new processing arrangements (e.g., non-uniform memory access systems—"NUMA" systems), data caching schemes have been utilized to remove at least some of the data storage requirement from the memory arrangements. In addition, cache devices are now utilized in the computer systems or in a close vicinity thereto. In a typical NUMA computer system, each node of a number of interconnected nodes includes one or more processors and a local system memory. Such computer systems are identified as having a non-uniform memory access because each processor has a lower access latency with respect to the data stored in the system memory at its local node than with respect to the data stored in the system memory at a remote node. The NUMA systems can be further classified as either non-coherent or cache coherent, depending on whether or not the data coherency is maintained between the caches in different nodes.

Conventional large-scale multi-processors with coherent caches offer a flexible and powerful computing environment. Indeed, the coherent caches reduce the problems associated with data partitioning, and provide a better support for parallelizing compilers, standard operating systems, and multiprogramming so as to offer a more flexible and effective use of the machine. The research has progressed in this area to provide a Cache-Coherent Non-Uniform Memory Access (CC-NUMA) machine. The CC-NUMA machine has a distributed main memory, a scalable interconnection network, and directory-based cache coherence. The directory-based schemes provide cache coherence, consuming only a small fraction of the system bandwidth without requiring message broadcasts.

U.S. Pat. No. 5,535,116 (the entire disclosure is incorporated herein by reference) describes that a shared-memory computer system (such as the NUMA machine) can be formed from a plurality of tightly-coupled processing nodes. Each processing node has a data processor for executing software instructions, a main memory cache, a processor cache disposed between the data processor and the main memory cache, and a directory memory. The main memory cache caches to a global shared memory space organized in pages, each page having a plurality of respectively addressed data items. The directory memory centralizes the directory information for each data item assigned to the processing node. The computer also has a general interconnection network for coupling the processing nodes. The directory memory has a state memory for maintaining the current state of each data item assigned to the respective processing node. In addition, the directory memory has a pointer to a master node for each data item, the master node being the processing node which has a master copy of the data item.

A dynamic random access memory ("DRAM") arrangement which includes a dual in-line memory module ("DIMM") can be used in a directory based, distributed shared memory microprocessor computer system. One type of the DIMM (i.e., a high memory capacity DIMM) is described in U.S. Pat. No. 6,049,476, the entire disclosure of which is incorporated herein by reference. Such DIMM is used as the data memory to store the data, and as the state memory to store the state or directory information corresponding to at least one portion of the data. The above-described DIMM allows the data and the state information to be accessed independently.

However, the prior art does not disclose a memory system (including a portion or a partition which stores the directory information for each cache line), especially the memory system which can be used with the commercially available (or standard) DIMMs. In addition, it is preferable to utilize the above-mentioned memory system for various-sized DIMMs, and without the necessity to provide extensive changes to the configuration of the memory system. It is preferable to utilize an embedded or external software modules to configure the memory system for determining which portion of the memory system is configured to store the directory information provided for at least one cache line, and which portion is configured to store the data.

SUMMARY OF THE INVENTION

From the foregoing, it may be appreciated that a need has arisen for a memory system which includes a portion/partition thereof that is configured to store directory information for each respective cache line, and another portion that is configured to store data. In accordance with the present invention, a memory device and method are provided to fulfill such need.

According to an embodiment of the present invention, there is provided a memory device and method which provide at least one memory segment in the memory device. The memory segment includes at least one first portion configured to store the data. The memory segment also includes at least one second portion which is associated with the first portion and configured to store the directory information provided for at least one cache line.

In another embodiment of the present invention, a plurality of memory segments (e.g., four memory segments) are provided, and each of the memory segments includes the corresponding first portion and the corresponding second portion.

According to yet another embodiment of the present invention, the memory segment is capable of providing the data and the directory information simultaneously.

In a further embodiment of the present invention, the second portion is provided at a predetermined address of the memory segment, the predetermined address being provided in a top-most section of the memory segment.

In another embodiment of the present invention, the memory segment is coupled to a further arrangement (e.g., a chip) via a single communication line. In response to a request from the further arrangement, the memory segment provides the data and the directory information to the further arrangement via the single communication line.

According to yet another embodiment of the present invention, the second portion has a size approximately 1/32 of a size of the memory segment. In addition, at least two of the memory segments may differ in size.

In a further embodiment of the present invention, the directory information is cached, and the memory segment may be arranged in a single memory unit. The memory segment can also be provided on a commercially available (e.g., standard) dual in-line memory module (DIMM).

According to still another embodiment of the present invention, there are two sets of the memory segments. A first set of the memory segments is connected to a first bus, and a second set of the memory segments is connected to a second bus.

Other technical advantages may be readily apparent to those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
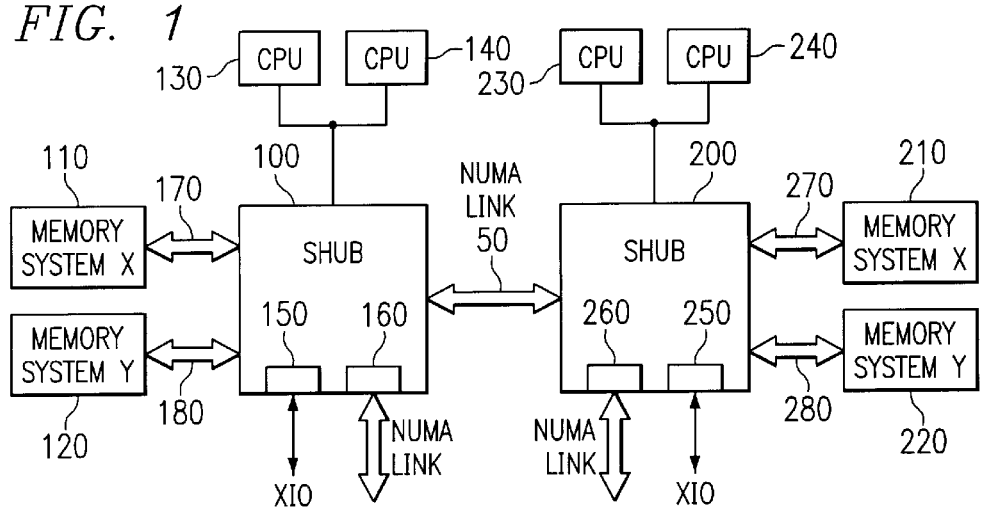
FIG. 1 is a general block diagram illustrating an embodiment of a system according to the present invention.

FIG. 1 shows general block diagram of an exemplary embodiment of an overall system according to the present invention that includes in a first computer system 100 and a second system 200. The first and second systems 100, 200 are interconnected via a NUMA Link 50 (i.e., a non-uniform memory access link). The NUMA Link 50 is capable of carrying data at the rate of, e.g., 3.2 Gigabytes/second. In other embodiments of the present invention, the data can be carried via the NUMA Link 50 at the rate of 1.6 Gigabytes/ second. As illustrated in FIG. 1, each of the first and second systems 100, 200 may include another NUMA connection arrangement 160, 260 for interacting with further systems and arrangements.

The overall system also includes a memory system X 110 and a memory system Y 120, each of which is connected via a respective bus to the first system 100. The second system 200 is also connected to its respective memory systems (i.e., a memory system X 210 and a memory system Y 220). The first system 100 can be connected to two CPUs 130, 140, and the second system 200 can also be connected to two CPUs 230, 240. The CPUs 230, 240, can be different from (or the same as) the CPUs 130, 140. It should be understood that in the NUMA systems such as the one described herein, the CPUs 130, 140 (which are connected to the first system 100) have access to the memory systems X, Y 210, 220 of the second system 200, and the CPUs 230, 240 (connected to the second system 200) have access to the memory systems X, Y 110, 120 of the first system 100.

Each of the first and second systems 100, 200 includes an XIO communication arrangement 150, 250 for connecting to input/output subsystems. In one exemplary embodiment of the present invention, each respective XIO port allows the data to be carried at the rate of 1.2 Gigabytes/second. In another exemplary embodiment of the present invention, one or both of the XIO communication arrangements 150, 250 can be substituted with a further NUMA communication arrangement to provide the data at an even faster rate.

Figure 2:
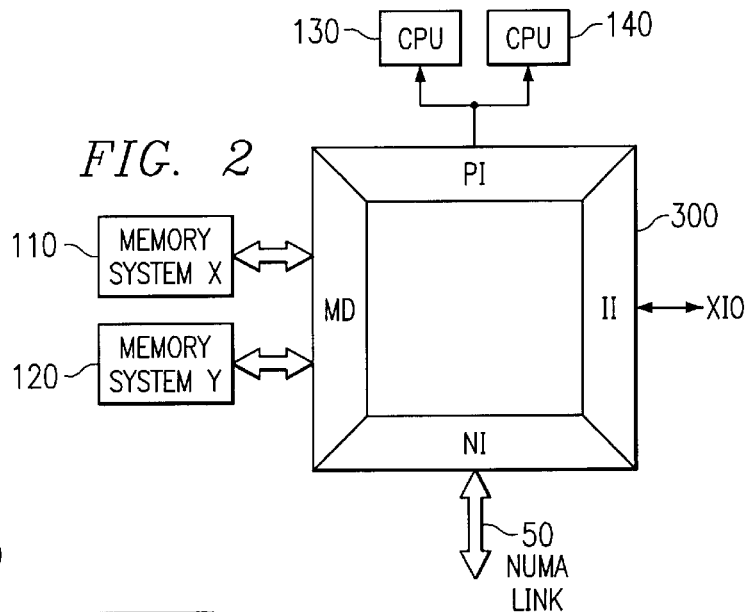
FIG. 2 is a block diagram of a control arrangement of the system shown in FIG. 1.

A detailed illustration of an exemplary embodiment of the first system 100 or the second system 200 according to the present invention is shown in FIG. 2 (which shall be referred to below as a "control arrangement 300" for the sake of clarity). In particular, the control arrangement 300 includes a memory/directory interface MD, a processor interface PI, a network interface NI and a further interface II. The memory/directory interface MD communicates with the respective first and second memory systems X, Y, and interconnects with the processor interface PI. The processor interface PI communicates with the CPUs 130, 140 (or with the CPUs 230, 240). The network interface NI communicates with other systems (e.g., to enable the first system 100 to communicate with the second system 200), and the further interface II provides data to the input/output subsystems via the respective XIO communication arrangement 150, 250 arrangement (or via the NUMA communication arrangement). The control arrangement 300 is connected via a first bus 170, 270 to the memory system X, and via a second bus 180, 280 to the memory system Y.

Figure 3:
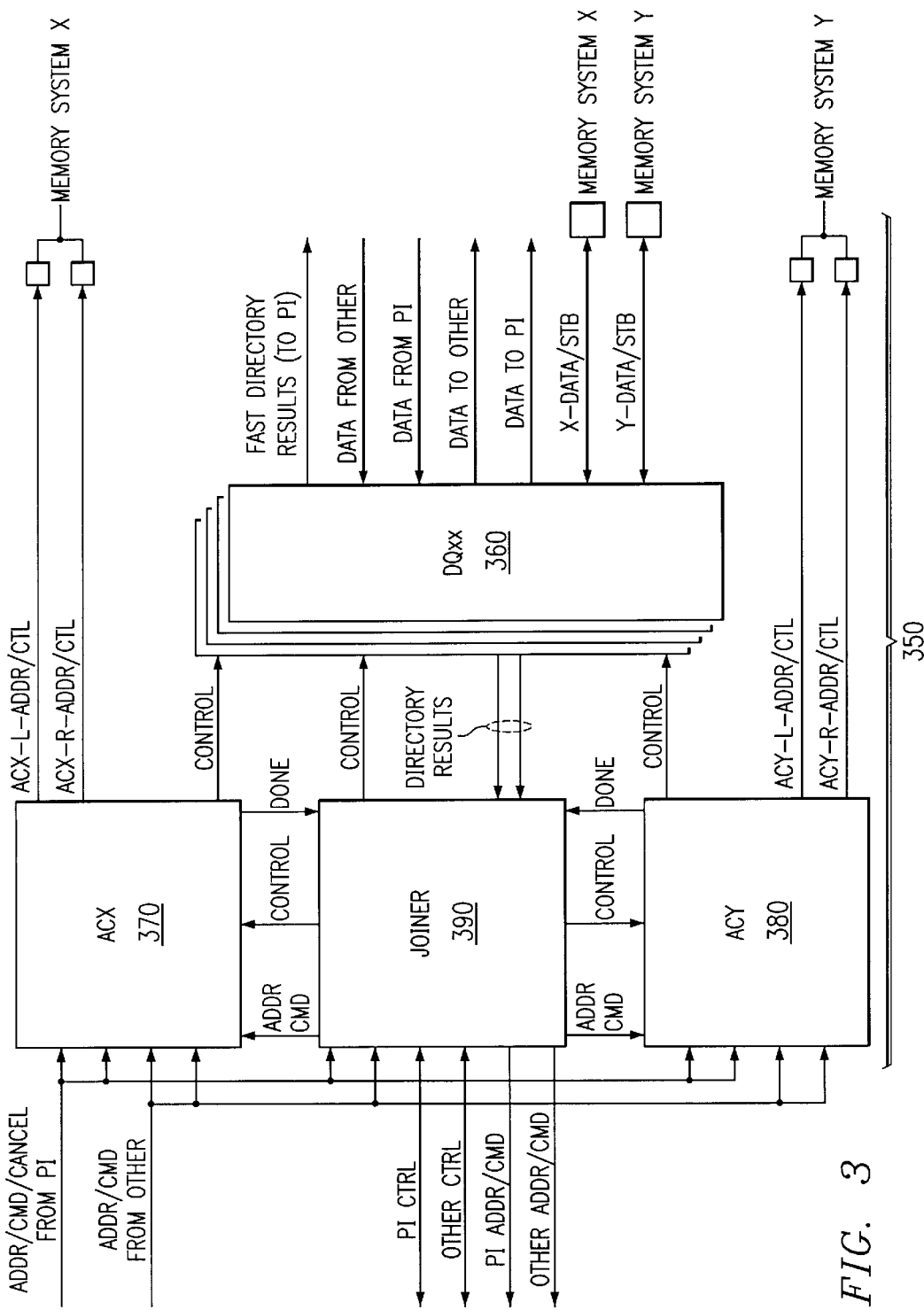
FIG. 3 is a detailed block diagram of a memory/directory interface of the control arrangement shown in FIG. 2.

A detailed illustration of an exemplary embodiment of the memory/directory interface MD is shown in FIG. 3. In this diagram, the memory/directory interface MD 350 is partitioned into seven arrangements, i.e., four data quadrants DQxx 360, a first DRAM address controller ACX 370 (the "X Controller"), a second DRAM address controller ACY 380 (the "Y Controller") and a joiner arrangement 390. The data quadrants 360 exchange data with the memory systems X, Y. The X Controller 370 provides address and control information to dual in-line memory modules ("DIMMs") of the memory system X, while the Y controller 380 provides address and control information to DIMMs of the memory system Y. Other arrows shown in FIG. 3 illustrate exemplary connections of the memory/directory interface MD 350 to further arrangements (e.g., chiplets) of the control arrangement 300.

In the exemplary embodiment of the present invention, each of the data quadrants 360 are capable of handling approximately one fourth of the data path of the memory/ directory interface MD 350, and includes approximately one fourth of the Directory Cache RAM. Two of the data quadrants 360 contain a modification logic for the directory entries, and also provide information to the Joiner 390 regarding which messages are to be transmitted. The data quadrants 360 can be subdivided in numerous ways, and the details of such subdivisions are not further discussed herein for the sake of clarity.

An exemplary operation of the memory directory interface MD 350 is described below as it relates to the control of the memory systems X, Y. In particular, each of the memory systems X, Y includes at least one DIMM, and one half of respective DIMM slots are attached to the control arrangement 300. In one exemplary embodiment of the present invention, the X Controller 370 controls the DIMMs of the memory system X that contain even cache line data and odd cache line directory information, while the Y Controller 380 controls the DIMMs of the memory system Y that contain odd cache line data and even cache line directory information. In operation, the X Controller 370 and the Y Controller 380 compare the current address against all cache lines to determine if they have any data thereon. If the cache lines have data thereon, the access to the memory systems X, Y may be delayed. After the availability of the memory system X, Y is established by the respective one of the X Controller 370 and the Y Controller 380, such controller arbitrates among the memory systems X, Y to obtain access thereto.

As discussed above, the memory system X communicates with the control arrangement 300 via the busses 170, 270, and the memory system Y communicates with the control arrangement via the busses 180, 280. Each of the busses connects to a set of four DIMMs. It is also possible that each of the memory busses 170, 180, 270, 280 may have a left side and a right side to communicate with the DIMMs of the memory systems X, Y that are connected an the respective left and right sides of the corresponding DIMMs. In such case, two of the data quadrants 360 communicate with the left sides of the memory busses for each of the memory systems X, Y, and the other two of the quadrants 360 communicate with the right sides of busses of each of the memory systems X, Y.

Of the two data quadrants 360 which serve the left side of the busses, one may be a primary quadrant since it would, most likely, contain the bulk of the directory logic. The other data quadrant can be considered a secondary quadrant because it contains only a small amount of the directory logic. However, the secondary quadrant may contain more of the data and the directory cache than the primary quadrant. In the exemplary embodiment of the present invention, the secondary quadrant is connected to 40 bits of data from each DIMM on its side (e.g., the left side or the right side), while the primary quadrant connects only to, e.g., 32 bits of the data.

For example the four data quadrants are identified as follows. The letters L (left) and R (right) are included to name the data quadrants 360, and the letters P (primary) and S (secondary) are also included in the names, which are as follows:

a. DQLP—(primary quadrant) handles the left side directory logic and 32 bits of the left side data path for each of the memory systems X, Y.
  b. DQLS—(secondary quadrant) handles 40 bits of the left side data path for each of the memory systems X, Y.
  c. DQRP—(primary quadrant) handles the right side directory logic and 32 bits of the right side data path for each of the memory systems X, Y.
  d. DQRS—(secondary quadrant) handles 40 bits of the right side data path for each of the memory systems X, Y.

Figure 4:
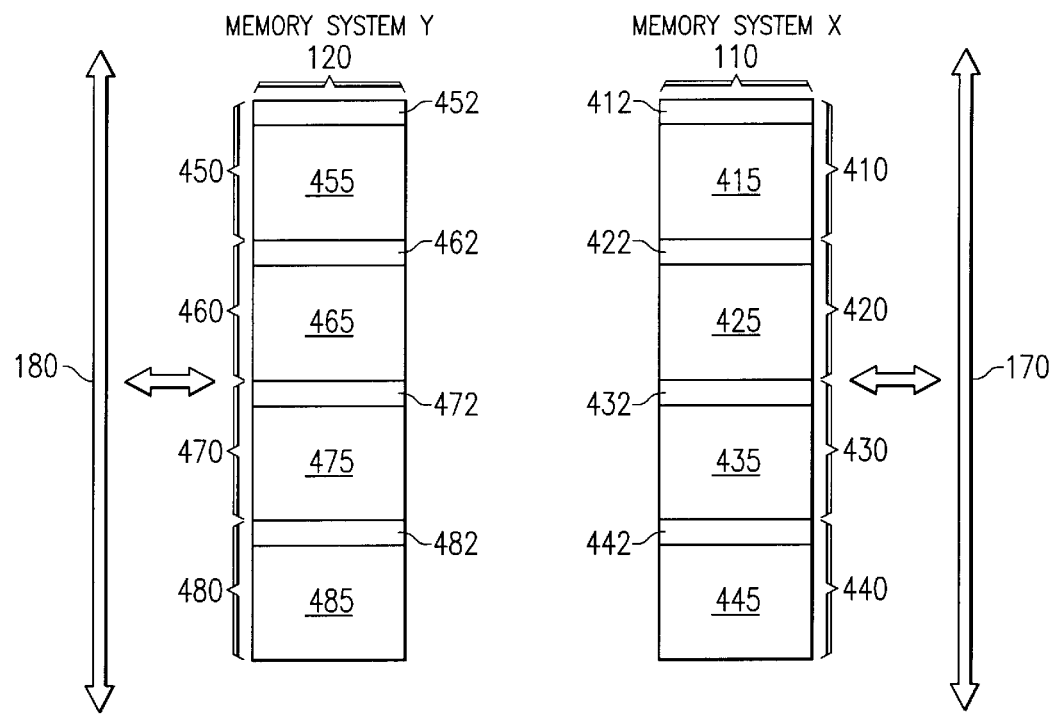
FIG. 4 is an exemplary implementation of memory systems according to the present invention in which each segment of the respective memory system has a first portion that is configured to store data, and a second portion that is configured to store directory information for at least one cache line.

A detailed illustration of the exemplary embodiment of the memory systems X, Y according to the present invention is shown in FIG. 4. For the sake of clarity, the discussion provided below shall address the first arrangement 100. However, it should be understood that this discussion is equally applicable to the second arrangement 200, as well as to other similar arrangements.

The memory system X 110 can be subdivided into four physical address regions (i.e., a first memory region 410, a second memory region 420, a third memory region 430, and a fourth memory region 440) which can collectively make up the capacity of the memory system X to be, e.g., 64 Gigabytes. In a similar manner, the memory system Y 120 can be subdivided into four physical address regions (i.e., a first memory region 450, a second memory region 460, a third memory region 470, and a fourth memory region 480) which can also collectively make up the capacity of the memory system Y to be, e.g., 64 Gigabytes. Other possible memory capacities are conceivable.

Each of the above-described regions preferably corresponds to a separate DIMM which is part of the respective memory system. As such, the regions 410, 420, 430, 440 may be four DIMMs of the memory system X, and the regions 450, 460, 470, 480 may be to four DIMMs of the memory system Y. The four regions 410, 420, 430, 440 of the memory system X are connected to the first memory bus 170, and the four regions 450, 460, 470, 480 of the memory system Y are connected to the second memory bus 180. Of course, it is possible to split the memory systems X, Y into more or less than four regions. Thus, it is possible to utilize more or less than four DIMMs connected to a single bus. In addition, because the memory systems X, Y may be subdivided into four memory regions (or segments), the present invention provides an advantageous way to determine which memory region (or segment) is to be accessed. For example, it is possible to utilize the first two bits of each of the memory system X, Y for such determination.

According to the present invention, each of the memory regions (or segments) 410, 420, 430, 440, 450, 460, 470, 480 have a respective first portion 412, 422, 432, 442, 452, 462, 472, 482 which is adapted for storing directory information for at least one cache line thereon, and a respective second portion 415, 425, 435, 445, 455, 465, 475, 485 which is adapted for storing the data thereon. It follows that each respective DIMM (e.g., the memory region 420) has two portions, i.e., the first portion (e.g., 422) and the second portion (e.g., 425)

The respective first and second portions can be configured to store the data and/or the directory information as described above by utilizing, e.g., a computer program which is resident on the control arrangement 300, on one or more of the CPUs 130, 140, 230, 240, or on a combination thereof.

In one exemplary implementation of the present invention, the first portion of each of the memory regions 410, 420, 430, 440, 450, 460, 470, 480 has the size which is approximately $\frac{1}{32}$ (or 3%) of the size of the respective memory region, and the second portion may have the size which is approximately $\frac{31}{32}$ (or 97%) of the size of the respective memory region. Therefore, the first portion 422 of the memory region 420 can be sized to be $\frac{1}{32}$ of the entire memory region 420, while the second portion 425 of the respective memory region 420 can be sized to be b $\frac{31}{32}$ of the memory region 420. One having ordinary skill in the art should understand that the first portion and the second portion can also be sized differently. In the exemplary embodiment shown in FIG. 4, each of the first portions of the respective memory regions 410, 420, 430, 440, 450, 460, 470, 480 are provided at an address which is provided in the top-most section of the respective memory region. However, it is possible to arrange one or more of the first portions at an address provided in the bottom-most section of the respective memory region, or in any other section of the respective memory system.

As discussed above, the memory system X is connected to the control arrangement 300 via the first bus 170, and the memory system Y is connected to the control arrangement 300 via the second bus 180. This scheme enables the data provided in the memory system X to be transmitted to a first cache (e.g., an X cache) of the control arrangement 300 via the first bus 170. It follows that the data stored in the memory system Y can be provided to a second cache (e.g., a Y cache) of the control arrangement 300 via the second bus 180.

One of the benefits of providing the directory information and the data on a single memory region (e.g., on a single DIMM) is that, in response to the request from the control arrangement 300 or from some other arrangement (e.g., from one of the CPUs 130, 140, 230, 240), the data and the directory information can be made available (or transmitted) to the requesting arrangement simultaneously and/or in parallel. This is possible because the data and the directory information is already provided in the same memory region (or DIMM).

Another advantageous feature of the present invention is its ability to utilize the commercially available (or standard) DIMMs, as well as the DIMMs having different sizes. In particular, the size of each of the four separate memory regions (e.g., the DIMMs) of the memory systems X, Y can be different. Such ability reduces the constraint of utilizing the same sized DIMMs in the memory systems X, Y. According to a preferable embodiment of the present invention, the DIMMs provided at the same locations on the respective bus should have the same size. Four separate registers (one for each region on the busses 170, 180) preferably control the size of the respective regions. For example, a first register controls the size of the memory regions 410, 450, a second register controls the size of the memory regions 420, 460, etc. Thus, the memory region 420 and the memory region 440 may have different sizes, while the memory region 420 (provided as the second region on the first bus 170) and the memory region 460 (provided as the second region on the second bus 180) should preferably have the same size because their size is preferably controlled by the same register.

As shall be discussed with in greater detail below, each of the memory systems X, Y may include two portions (i.e., the left side portion and the right side portion), and both such portions of each provide the access to 72 bits thereof. This configuration of the memory systems X, Y enables the sharing of the data connections of the respective memory system with other systems (e.g., the CPUs).

Figure 5:
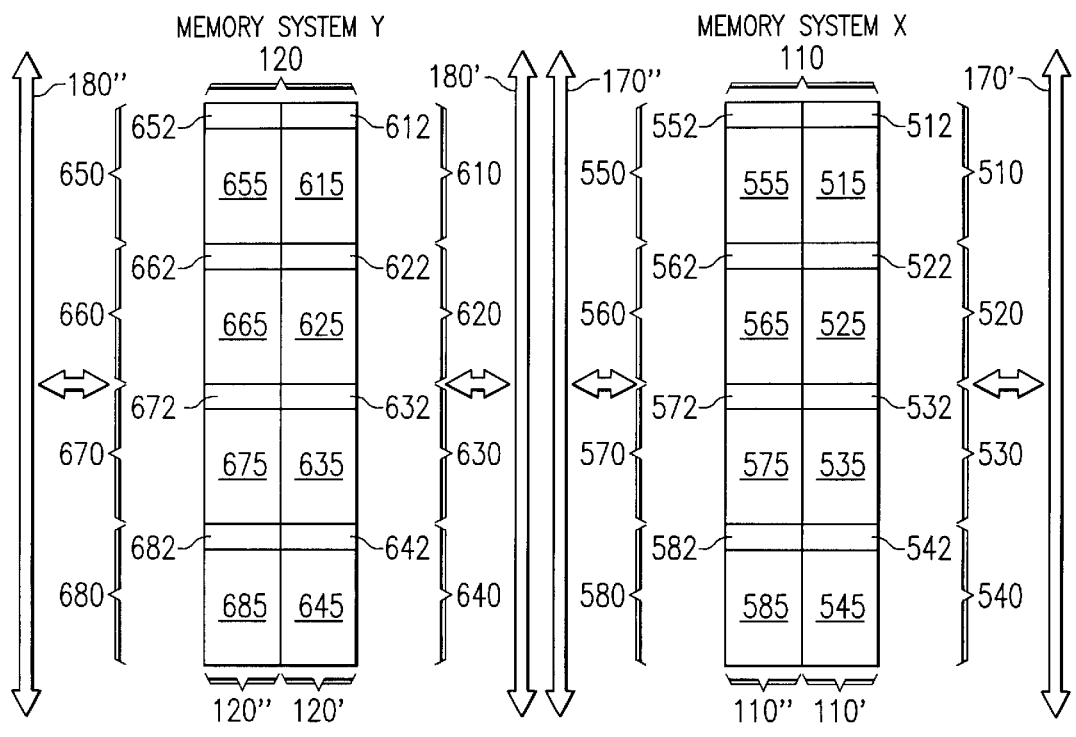
FIG. 5 is another implementation of the memory systems according to the present invention in which each memory system has a left side portion and a right side portion.

FIG. 5 shows such exemplary implementation of the memory systems according to the present invention in which each of the memory systems X, Y has the left side portion and the right side portion. In this exemplary implementation, the memory system X is subdivided into the right side portion 110' and the left side portion 110". Each one of the right and left side portions 110', 110" has four physical address (or memory) regions. In particular, the right side portion 110' of the memory system X has a first memory region 510, a second memory region 520, a third memory region 530, and a fourth memory region 540. Similarly, the left side portion 110" of the memory system X also has a first memory region 550, a second memory region 560, a third memory region 570, and a fourth memory region 570. It is preferable for the two portions 110', 110" of the memory system X to be interleaved.

The memory system Y is also subdivided into the right side portion 120' and the left side portion 120". Each of the right and left side portions 120', 120" are subdivided into four physical address regions, i.e., respective first memory regions 610, 650, respective second memory regions 620, 660, respective third memory region 630, 670, and respective fourth memory region 640, 680. It should be understood that other possible memory arrangement configurations are also conceivable.

This embodiment can be used especially when the first bus 170 is comprised of a first right bus 170' and a first left bus 170", and when the second bus 180 is comprised of a second right bus 180' and a second left bus 180". The first right bus 170' preferably communicates with the first memory region 510, the second memory region 520, the third memory region 530, and the fourth memory region 540. The first left bus 170" communicates with the first memory region 550, the second memory region 560, the third memory region 570, and the fourth memory region 580. The second right bus 180' preferably communicates with the first memory region 610, the second memory region 620, the third memory region 630, and the fourth memory region 640. The second left bus 180" communicates with the first memory region 650, the second memory region 660, the third memory region 670, and the fourth memory region 680.

Similarly to the embodiment illustrated in FIG. 4, each of the above-described memory regions is preferably a separate DIMM which is part of the respective memory system and as such are in physically separate units. In addition, the memory regions of the memory system X are subdivided into the first respective portions 512, 522, 532, 542, 552, 562, 572, 582 which are adapted for storing the directory information for a cache line, and into the second respective portions 515, 525, 535, 545, 555, 565, 575, 585 which are adapted to store the data. It follows that the memory regions of the memory system Y are also subdivided into the first respective portions 612, 622, 632, 642, 652, 662, 672, 682 which are adapted for storing the directory information for a cache line, and the second respective portions 615, 625, 635, 645, 655, 665, 675, 685 which is adapted to store the data. The various characteristics of the embodiment described above with reference to FIG. 4 apply equally to this embodiment.

Figure 6:
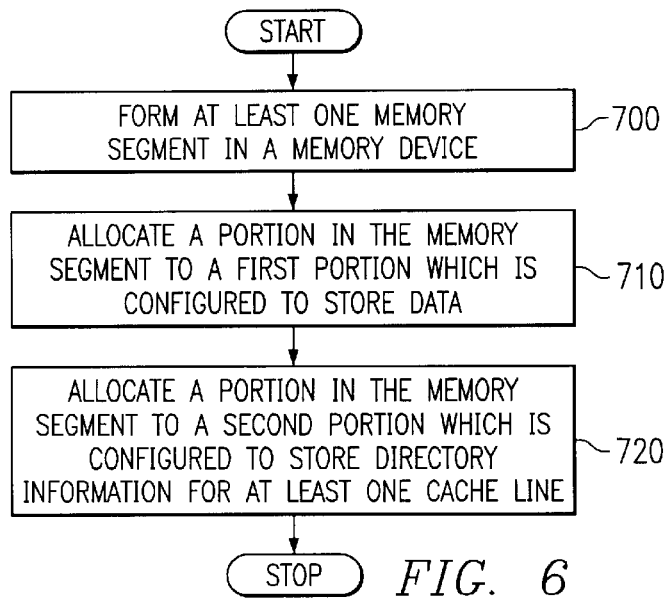
FIG. 6 is an exemplary embodiment of a method for providing the memory system according to the present invention.

FIG. 6 shows an exemplary embodiment of a method for providing the memory systems X, Y as described above with reference to FIGS. 4 and 5. In particular, in step 700, at least one memory region is formed in one or more of the memory systems X, Y. As discussed above, this memory region can be a DIMM, and the exemplary embodiment of the method can provide a plurality of such memory regions. In step 710, a portion of the memory region is allocated so as to store the data thereon (e.g., the second portion 425 of the memory region 420). Then, in step 720, another portion of the memory region is allocated so as to store the directory information for at least one cache line thereon (e.g., the first portion 422 of the memory region 420). It should also be understood that the detailed description of the various features provided above with reference to FIGS. 4 and 5 is equally applicable to the exemplary embodiment of the method according to the present invention shown in FIG. 6. It should be understood that this exemplary method can be executed on the control arrangement 300, or on any other arrangement which is connected to the control arrangement 300.

Thus, it is apparent that there has been provided, in accordance with the present invention, a memory device and method which provide at least one memory region that includes a first portion configured to store the data and a second portion and configured to store the directory information for at least one cache line. Although the present invention has been described in detail, it should be understood that various changes, substitutions, may be made herein. For example, the directory information within a second portion of a memory segment may be associated with the data in a first portion of the memory segment. Alternatively, the directory information within a second portion of a memory segment may be associated with data in a first portion of a different memory segment or not related to any stored data in any memory segment. Other examples may be readily ascertainable by those skilled in the art and may be made herein without departing from the spirit and scope of the present invention as defined by the following claims.

What is claimed is:

1. A memory device, comprising:
   at least one memory segment including:
      at least one first portion configured to store data, and
      at least one second portion configured to store directory information that is provided for at least one cache line, wherein the directory information is cached.

2. The memory device according to claim 1, wherein memory device includes a plurality of memory segments, and wherein each of the memory segments comprises one of the at least one first portion and one of the at least one second portion.

3. The memory device according to claim 2, wherein the memory device includes four memory segments.

4. The memory device according to claim 1, wherein the at least one memory segment is capable of providing the data and the directory information simultaneously.

5. The memory device according to claim 1, wherein the at least one second portion is provided at a predetermined address of the at least one memory segment.

6. The memory device according to claim 5, wherein the predetermined address is provided in a top-most section of the at least one memory segment.

7. The memory device according to claim 1, wherein the at least one memory segment is coupled to a further arrangement via a single communication line, and wherein, in response to a request from the further arrangement, the at least one memory segment provides the data and the directory information to the further arrangement via the single communication line.

8. The memory device according to claim 7, wherein the further arrangement is a processor chip.

9. The memory device according to claim 1, wherein the at least one second portion has a size approximately 1/32 of a size of the at least one memory segment.

10. The memory device according to claim 3, wherein at least two segments of the four memory segments differ in size.

11. The memory device according to claim 1, wherein the at least one memory segment is arranged in a single memory unit.

12. The memory device according to claim 1, wherein the at least one memory segment is provided on a standard dual in-line memory module (DIMM).

13. The memory device according to claim 1, wherein the at least one memory segment includes a first set of memory segments and a second set of memory segments, and wherein the first set of the memory segments is connected to a first bus, and the second set of the memory segments is connected to a second bus.

14. The memory device according to claim 1, wherein the directory information of the second portion is associated with the data of the first portion.

15. The memory device according to claim 1, wherein the directory information of the second portion is associated with data stored in a different memory segment.

16. A method for providing directory information and data in a memory device, comprising the steps of:

forming at least one memory segment in the memory device; allocating at least one first portion in the at least one memory segment, the at least one first portion being configured to store the data;

allocating at least one second portion in the at least one memory segment, the at least second portion being configured to store the directory information;

caching the directory information;

wherein the directory structure is provided for a cache line.

17. The method according to claim 16, wherein a plurality of memory segments are formed in the memory device, wherein allocating at least one first portion includes allocating the at least one first portion for each of the memory segments, and wherein allocating at least one second portion includes allocating the at least one second portion for each of the memory segments.

18. The method according to claim 17, wherein the memory device include four memory segments.

19. The method according to claim 16, further comprising:

receiving a request at the memory device from a predetermined location; and in response to the request, simultaneously providing the data and the directory information to the predetermined location.

20. The method according to claim 16, wherein allocating at least one second portion includes arranging the second portion at a predetermined address of the at least one memory segment.

21. The method according to claim 20, wherein the predetermined address is provided at a top-most section of the at least one memory segment.

22. The method according to claim 16, wherein the at least one memory segment is coupled to a further arrangement via a single communication line, the method further comprising:

receiving a request from the further arrangement; and in response to the request, providing the data and the directory information to the further arrangement via the single communication line.

23. The method according to claim 22, wherein the further arrangement is a chip.

24. The method according to claim 16, wherein forming at least one memory segment includes forming the at least one memory segment to have a first size, and wherein allocating at least one second portion includes forming the at least one second portion to have a second size, the second being approximately 1/32 of the first size.

25. The method according to claim 18, wherein at least two of the four memory segments differ in size.

26. The method according to claim 16, wherein the memory device is a single memory unit.

27. The method according to claim 16, wherein the at least one memory segment is provided on a standard dual in-line memory module (DIMM).

28. The method according to claim 16, wherein the at least one memory segment includes a first set of memory segments and a second set of memory segments, and wherein the first set of the memory segments is connected to a first bus, and the second set of the memory segments is connected to a second bus.

* * * * *